(No Model.)

J. JAMESON.
MANUFACTURE OF COKE.

No. 307,050. Patented Oct. 21, 1884.

Attest.
Geo. T. Smallwood.
C. J. Hedrick.

Inventor
John Jameson
By A. Pollok
his Atty.

UNITED STATES PATENT OFFICE.

JOHN JAMESON, OF NEWCASTLE-UPON-TYNE, ENGLAND.

MANUFACTURE OF COKE.

SPECIFICATION forming part of Letters Patent No. 307,050, dated October 21, 1884.

Application filed November 3, 1882. (No model.) Patented in England April 25, 1882, No. 1,947; in France October 21, 1882, No. 151,671; in Belgium October 23, 1882, No. 59,368; in Canada November 21, 1882, No. 15,804, and extended April 30, 1883, Nos. 14,775 and 16,776, and in Italy June 30, 1883, XVII, 15,490, XXX, 491.

*To all whom it may concern:*

Be it known that I, JOHN JAMESON, a subject of the Queen of Great Britain, residing at Newcastle-upon-Tyne, England, have invented new and useful Improvements in the Manufacture of Coke, (for which I have obtained a patent in England, No. 1,947, bearing date April 25, 1882,) of which the following is a specification.

My invention consists of a method whereby what is called "hard coke" can be manufactured without the loss of all the products of distillation, as is usual in the ordinary processes of the manufacture of hard coke. I construct the coke-oven with one or more passages in the floor or lower part, but otherwise of the ordinary construction. The passages are connected to a range of pipes and an exhauster with condensing-pipes and other appliances to separate the various products obtained. The oven is charged as usual, and when well ignited on the top I apply gentle exhaustion at the bottom through the passages and pipes referred to, so as to remove a part of the nascent products of distillation, instead of allowing them to pass up through the ignited portion of the charge. As this has the effect of impoverishing the coke and making it more soft, I use part or the whole of the gas so extracted, and part or the whole of the rich hydrocarbon of the tar in a similar oven at a more advanced stage of ignition, so as that the carbon of the hydrocarbon gas or vapor shall be deposited on and within the interstices of the coke so treated, and the hydrogen shall be burned at the surface or passed away to burn in the chimney, the difference between my process and the usual method of manufacturing coke being this: Instead of allowing the products of slow distillation liberated by the descending heat to pass direct into the upper part of the same oven, I remove them from the oven generating them, and separating the more valuable parts—as the ammonia and certain of the products of tar—which are more or less useless for the enrichment of the coke and absolutely wasted, I pass the gas and other hydrocarbons, or a part of them, into an oven in an advanced condition as regards ignition, so as more effectually to deposit the carbon contained, and to give great density and compactness to the coke produced.

Figure 1:
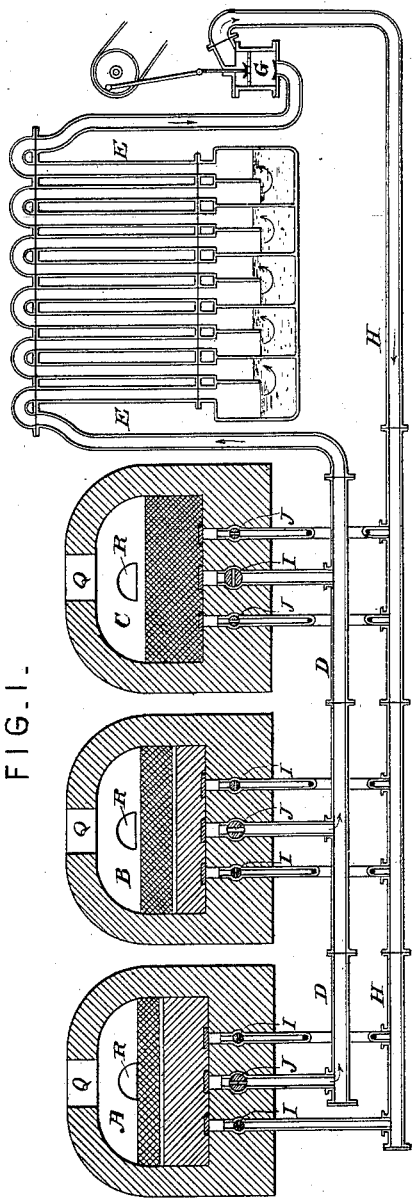
Figure 2:
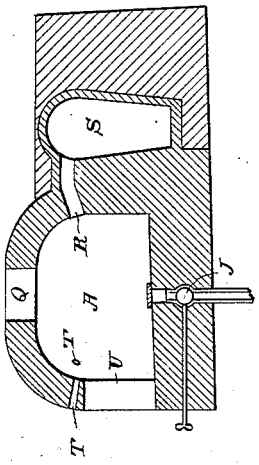

Having thus described the nature of my invention, I will proceed more particularly to describe the mode of performing the same in and by the following statement, and by and of the accompanying sheet of drawings, which represent a simple apparatus for use in the process, Figure 1 being a vertical longitudinal section, and Fig. 2 a cross-section; and, before describing the process and apparatus, I wish it to be clearly understood that my said invention or parts of my said invention may be used together or separately—that is to say, I may extract more or less the products of the slow distillation of coal in a coke-oven, and use these products in whole or in part for any other purpose than that already described; or I may employ hydrocarbons obtained in any other way for the enrichment of coke by the process described; or I may store in a gasometer the gas obtained from a certain coke-oven, to be returned in whole or in part at a later time to the same oven; or instead of producing a slight difference of pressure in different parts of the oven, so as to assist the flow of gas in the same by exhausting from the bottom, I may produce this slight difference of pressure by a gentle pressure in the top of the oven, giving with this slight pressure an adequate supply of air to maintain combustion; or I may, in certain cases, where there is considerable depth of very rich coal, simply provide a means of exit for the nascent gas otherwise than through the fire; but I prefer, as a matter of convenience of arrangement, to use the invention as a whole substantially in the manner already set forth.

I have described the oven as of the ordinary construction, by which I do not mean of necessity the most ordinary construction, but of any ordinary construction—that is to say, a roofed or reverberatory oven giving ingress to the air and egress to the products of combustion at the upper part of the oven. The air may be admitted through the door or through a series of holes or openings, and the supply be regulated by a sliding cover or covers.

Both these modes are well known, and have been in common use. The products of combustion may pass off by way of the charging-hole in the roof, which is left open for the purpose; or special flues may be provided. Both modes have been used.

In operating according to my invention regard should be had to the fact that it is desirable so to proportion the depth of coal operated upon and the position of the suction-orifices and supply-pipes as that air shall not, unless in small quantities, be liable to be drawn through the ignited coke, and that on the return of the gas it shall not have so small a surface to deposit upon as that (unless in small quantities) it escapes from the ignited mass before being sufficiently decomposed. I wish further to draw attention to the point following. Whereas in the gradual coking of the coal there is ordinarily formed a species of more or less air-tight diaphragm, due to the caking of good coking-coal just at the point at which the heat becomes adequate to produce this agglomeration of particles, and therefore suction may be applied almost exclusively at any one point below this diaphragm without much risk of cutting an air-passage in or near the shortest line toward it, yet after the mass of coke has become entirely ignited the protection of this diaphragm is gone; and I therefore prefer to use a more diffused system for the supply of gas by means of a more extended series of pipes. These are necessary for extraction of the gas, and I may use an entirely different set of pipes and differently arranged, so as to give a large number of passages for the supply of gas, and so as to be able to regulate from the appearance of the oven more or less supply to certain parts. I may also, by combining the distillation of tar with the other process, supply through the supply-pipes I have referred to or any of them a certain quantity of pitch or more or less distilled tar or common raw tar, so as to produce more dense deposit. I desire also to draw attention to the fact that in certain places where the value of the products of distillation of coal may bear a more than usual proportion to the value of the coke I may apply such suction to the oven as to extract as much of the products of distillation as possible; but when the products of distillation are of less value I prefer to diminish the quantity extracted, so as to avoid risk of passing air from inattention. In order to diminish the risk of passing too large a quantity of oxygen into the ignited coke, and so consuming more than is desired, I may also supply the upper part of the oven-chamber with a portion of the waste gases of the chimney, either at or about atmospheric pressure, or, if pressure instead of exhaustion be used, slightly above atmospheric pressure, so as that, if air or gas beyond that generated by the heating of the coal should pass through the mass of ignited cinder by means of the pressure or suction, it may be an air or gas which is comparatively inert in the consumption of the coke, from having been in whole or in part already burned.

In order more clearly to illustrate the nature of my invention and the manner of performing the same, I will now proceed to describe a form of apparatus constructed for the working of the same, reference being had to the drawings hereto attached.

A, B, and C represent three coke-ovens. They are built alike. In the arched roof is the charging-hole Q, in the back wall at the upper part of the oven, the opening R affording egress to the products of combustion, and in the front wall the sight-holes T giving ingress to the air. The products of combustion pass off by the flue S, which is common to the three ovens. The door U is closed (as usual) during the coking operation, to prevent access of air at the lower part of the oven. In Fig. 1 each oven is shown as containing its charge of coal. These charges are represented by shaded and cross-shaded lines. By the singly-shaded lines I represent raw coal, and by the doubly-shaded lines I represent coal after its ignition, the oven C being supposed to be that first charged, then B and A, respectively, as more lately charged, the position of the shaded lines representing the progress made toward ignition. The dividing-line between the singly and doubly shaded lines in the charge represents the imaginary position of a stratum of coal which has become more or less agglomerated by heat, and which forms a diaphragm more or less tenacious and resistant to the passage of gas or air.

D is a pipe, a branch from which passes into and terminates in the bottom of each oven, the orifice of which within the oven is covered with a fire-clay quarl, so as to keep coal or cinder out of the pipe.

I show in the drawings one pipe and one orifice only to each oven, for the sake of clearness; but one or more may be used. The pipe D communicates with a range of cooling-pipes, (shown at E,) similar to those used in gas-works, and thence with an exhauster at G, of any convenient form. That which I have shown at G is an air-pump.

For the sake of clearness I show the connection through the exhauster direct to a second pipe, H, communicating with each oven. There are provisions represented as sections of stop-cocks near the junction of each pipe and oven, so as to enable me to open or close communication at will. These stop-cocks are shown at I and J, those marked I being closed and those marked J open. If, in these circumstances, the exhauster be not operated, and thereby the passage D be practically closed, the nascent gas liberated in the heated coal under the most tenacious part of the diaphragm I have described will force its way up through this diaphragm, and although part of its hydrocarbon may be decomposed by contact with the incandescent coke above it, a considerable part will and does usually arrive at the surface of the charge, and this portion burns with a more or less white flame, and is practically wasted; but if the exhauster be operated so as that the pneumatic pressure in a downward direction is less than the pressure in an upward direction, the gas formed will pass by the course of least pressure and escape decomposition, and in the range of cooling-pipes the water, ammonia, tar, and other merely volatile products may be condensed; and having regard to the consideration before referred to, the supply of gas is like to the exhaustion. It may be effected by suction at the top of the oven—as, for instance, by connection to a good chimney while the door is well closed, or by pressure from the pressure side of the exhauster, as shown in the drawings, or from a gasometer or otherwise—the quantity of gas supplied being regulated by consideration of the relative values at the place where the process is carried on of the gas and the coke produced respectively.

I am aware that heretofore it has been proposed in the manufacture of charcoal to withdraw the gases generated during the process of carbonization, recover certain waste products therefrom, and return the uncondensed gases to the furnace. I do not, however, regard the manufacture of charcoal as at all analogous to my process, the methods of procedure, the ends to be accomplished, and the resulting products in the one being different from those in the other. In making charcoal it is common not to fire the mass of wood to be distilled, the heat being supplied from a special furnace. The charge does not burn from the top downward, but vice versa; and, moreover, in the processes referred to, the uncondensed gases are not returned to the kiln or oven to enrich the resulting product, but to the furnace to be burned, and thus aid in carbonizing the wood. It has also been proposed, as I am aware, to withdraw the gases from a charge of coal being coked, recover therefrom products ordinarily wasted, and return the residue to the furnace. Such a process is described, for example, in patent of Markle and Smith, No. 235,368, dated December 14, 1880. In such process, however, the gases, instead of being withdrawn from the bottom, are drawn from the top of the furnace, where they are exposed to the intense heat of the burning charge and to a great extent consumed. Should air gain access to the gases in this position, they would explode. Air is therefore necessarily excluded, whereas in my process it is necessarily admitted. The charge of coal in the former process burns from the bottom upward, just the reverse of my process. Moreover, the uncondensed gases are returned in the former to the burning mass of coal, are consumed, and thus utilized in burning off the charge, whereas in my process the gases are returned to an oven wherein the charge is entirely burned off, and are not consumed but decomposed, depositing carbon in the interstices of the coke.

I am also aware of the coking-oven described in United States patent of Levi Stevens, No. 196,714, dated October 30, 1877. In this the whole volume of gases from one oven are said to pass directly into an adjoining oven containing a highly-heated body of coke. This process differs from mine in many material respects. The gases are not withdrawn from the bottom of the furnace, there is no recovery of waste products, and the gases are not furnished to the second oven in a way to distribute themselves equally throughout the mass of coke, but from the construction of the furnace would come in contact with a part of it only. By my invention the quantity of returned gases is regulated, they can be admitted in the proper condition and quantity and at the right moment to secure the best results, and they are passed into the oven in such a way that they must necessarily traverse the whole body of the incandescent coke.

Having now fully described my said invention and the manner of carrying the same into effect, what I claim is—

1. In the manufacture of coke according to the ordinary process of igniting the charge at the top and burning gradually downward in a suitable oven giving ingress to the air and egress to the products of combustion at the upper part of said oven, the improvement consisting in withdrawing from the lower part of the oven the gases and vapors generated in or distilled from the coal below that in combustion, substantially as described.

2. In the manufacture of coke according to the ordinary process of igniting the charge at the top and burning gradually downward in a suitable oven giving ingress to the air and egress to the products of combustion at the upper part of the oven, the improvement consisting in withdrawing from the lower part of the oven the gases and vapors generated in or distilled from the coal below that in combustion, and treating said gases and vapors to recover materials therefrom, such as oil, ammonia, and the like, substantially as described.

3. In the manufacture of coke according to the ordinary process of igniting the charge at the top and burning gradually downward in a suitable oven giving ingress to the air and egress to the products of combustion at the upper part of the oven, the improvement consisting in introducing at an advanced stage in the coking a regulated supply of hydrocarbon at the bottom of the charge, substantially as described, so that the coke will be equally enriched by deposit of carbon.

4. In the manufacture of coke according to the ordinary process of igniting the charge at the top and burning gradually downward in a suitable oven giving ingress to the air and egress to the products of combustion at the upper part of said oven, the improvement consisting in withdrawing from the lower part of the oven the gases and vapors generated in or distilled from the coal below that in combustion, treating said gases or vapors to recover materials therefrom, such as oil, ammonia, and the like, and introducing at an advanced stage in the coking a regulated supply of the purified hydrocarbon gases or vapors at the bottom of the charge, substantially as described.

5. In the manufacture of coke according to the ordinary process of igniting the charge at the top and burning gradually downward, the combination, with the roofed or reverberatory oven provided with openings for giving ingress to the air and egress to the products of combustion at the upper part, and practically closed to the admission of air at the lower part, of said oven, of one or more outlets, and an exhaust or suction apparatus for withdrawing from the lower part of the oven the gases and vapors generated in or distilled from the coal below that in combustion, substantially as described.

6. In the manufacture of coke according to the ordinary process of igniting the charge at the top and burning gradually downward, the combination, with the roofed or reverberatory oven provided with openings for giving ingress to the air and egress to the products of combustion at the upper part, and practically closed to the admission of air at the lower part of the oven, of the outlet and exhaust for withdrawing from the lower part of the oven the gases and vapors generated in or distilled from the coal below that in combustion, and the purifiers, condensers, or scrubbers for treating said gases and vapors to recover therefrom materials such as oil, ammonia, and the like, substantially as described.

7. In the manufacture of coke according to the ordinary process of igniting the charge at the top and burning gradually downward, the combination, with the roofed or reverberatory oven provided with openings for giving ingress to the air and egress to the products of combustion at the upper part, and practically closed to the admission of air at the lower part, of the oven, of one or more pipes and their connections for introducing at an advanced stage in the coking a regulated supply of hydrocarbon at the bottom of the charge, substantially as described, so that the coke will be equally enriched by deposit of carbon.

8. In the manufacture of coke according to the ordinary process of igniting the charge at the top and burning gradually downward, the combination, with an oven provided with openings for giving ingress to the air and egress to the products of combustion at the upper part of said oven, of the outlet and exhaust for withdrawing from the lower part, and practically closed to the admission of air at the lower part, of the oven, the gases and vapors generated in or distilled from the coal below that in combustion, the purifiers, condensers, or scrubbers for treating said gases or vapors to recover therefrom materials such as oil, ammonia, and the like, and the pipes and connections for introducing at an advanced stage in the coking a regulated supply of the purified hydrocarbon gases or vapors at the bottom of the charge, substantially as described.

JOHN JAMESON.

Witnesses:
   ANT. G. SCHAEFFER,
     38 *Eldon Street, Newcastle-on-Tyne.*
   JOHN BOWMER,
     15 *James Street, Gateshead-on-Tyne.*